United States Patent
Hugo (10) Patent No.: US 7,289,935 B1
(45) Date of Patent: Oct. 30, 2007

(54) STATISTICAL QUALITY CONTROL OF ALARM OCCURRENCES

(76) Inventor: Alan J. Hugo, 805 Waingafth Way, Danville, CA (US) 94526

( * ) Notice: Subject to any disclaimer, the term of this patent is extended or adjusted under 35 U.S.C. 154(b) by 0 days.

(21) Appl. No.: 11/497,441

(22) Filed: Aug. 2, 2006

(51) Int. Cl.
G04F 1/00 (2006.01)
G06F 17/18 (2006.01)

(52) U.S. Cl. .................. 702/176; 340/506; 702/179; 702/181

(58) Field of Classification Search .............. 702/130, 702/132, 176, 179, 181, 187; 700/30, 33, 700/506; 714/47; 340/506, 573.1
See application file for complete search history.

(56) References Cited

U.S. PATENT DOCUMENTS

| | | | |
|---|---|---|---|
| 5,257,206 A | 10/1993 | Hanson | 700/273 |
| 6,308,141 B1 | 10/2001 | Osamu et al. | 702/179 |
| 6,618,691 B1 | 9/2003 | Hugo | 702/181 |
| 6,690,274 B1 * | 2/2004 | Bristol | 340/506 |
| 7,076,695 B2 | 7/2006 | McGee et al. | 714/47 |

OTHER PUBLICATIONS

Levinson, W., 1990, Understand the Basics of Statistical Process Control.
Jacobs, D.C., 1990, Watch out for Nonnormal Distributions.
EEMUA, 1999, Alarm Systems, A Guide to Design, Management & Procurement.

* cited by examiner

*Primary Examiner*—John Barlow
*Assistant Examiner*—John Le (57) ABSTRACT

A method for evaluating an alarm system for continuous or semi-continuous processes that gives an indication of the actual loading on the operator. A transformations is applied to a data set consisting of alarms and associated times, resulting in the data being much more amenable to common techniques of statistical quality control. The technique requires only a history of alarm events, and the transformation has a strong intuitive appeal.

1 Claim, 7 Drawing Sheets

STATISTICAL QUALITY CONTROL OF ALARM OCCURRENCES

CROSS-REFERENCE TO RELATED APPLICATIONS

None

STATEMENT REGARDING FEDERALLY SPONSORED RESEARCH AND DEVELOPMENT

N/A

OTHER REFERENCES

Levinson, W., *Understand the Basics of Statistical Process Control* Chemical Engineering Progress; pp. 28-37, November 1990.
Jacobs, D. C., *Watch Out For Nonnormal Distributions*, Chemical Engineering Progress, pp., 19-27, November 1990.
*Alarm Systems, A Guide to Design, Management, and Procurement* EEMUA, 1999

BACKGROUND

1. Field of Invention

This invention relates to a transformation of industrial process alarm occurrence data so that it will be suitable for standard statistical quality control analysis.

2. Discussion of Prior Art

Industrial processes are typically monitored and controlled by computers, which scan hundreds or thousands of process measurements. Associated with each measurement may be one or more alarm limits, which notify the plant operator that the plant requires special attention when the measurement exceeds the limit. A common problem in many plants is that many alarms from different measurements may occur close to one another in time, so that the operator is overwhelmed with alarms and loses effectiveness at controlling the plant. Indeed, a contributing or direct cause of many plant upsets have been due to the overwhelming number of alarms that have been presented to the operator.

This situation is of concern in industry, and there are guidelines as to the maximum amount of alarms in a given time period that an operator can handle and still be effective. In particular, the manual *Alarm Systems, A Guide to Design, Management, and Procurement* (EEMUA, 1999) contains numerical values of acceptable alarm metrics that have been widely adapted (but perhaps not met) by industry.

Figure 1:
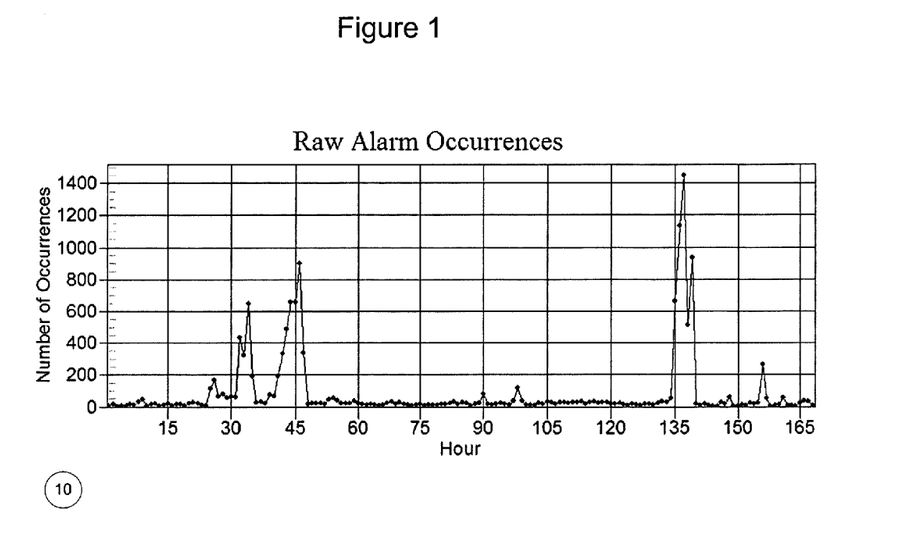
FIG. 1 is a typical run chart representing the number of alarms per hour in a typical operating plant.

There are several software packages that will plot a statistical quality control run chart on the number of alarms per given time period, and compare these values with the EEMUA recommended values. FIG. 1 is an example of such a run chart. Often, industrial software will have the points in the run chart replaced by bars, but the two formats are essentially equivalent.

It is apparent from FIG. 1 that the number of alarms per hour is a stochastic process, and that the techniques of statistical quality control provide a suitable framework for tracking and analyzing alarm system performance. Statistical quality control techniques are widely used in industry and provide a solid theoretical framework for interpreting stochastic processes.

Suitable confidence intervals may be superimposed on the run chart, in which case it would be termed a control chart. These confidence limits give some indication whether the measurement is within acceptable limits, given the capabilities of the process, or whether attention should be given to correct the process. Statistical quality control techniques also imply a probabilistic quality to the measurement—a measurement may be outside acceptable limits due to chance alone, and not to some actual shift in the process.

There is a fundamental difficulty in interpreting the plot of alarm occurrences over time. Typically, what is found in alarm systems is that there may be some time periods where the number of alarms is considerably above the median number of alarms. Almost always, this high number is due to the occurrence of a chattering alarm. A chattering alarm occurs when the process measurement hovers close to an alarm limit, so that random movement in the process causes the alarm to go rapidly on and off as the process crosses the alarm limit. Tens or hundreds of alarms may be generated in a short period from a chattering alarm.

Interpretation of the run chart or control chart is difficult with the inclusion of the alarm chatters. It is difficult to see any trend in the data, and the plot scaling is such that the number of alarms during "normal" operation are too small to be observed on the plot.

However, several alarm events from one chattering alarm are fundamentally different than several alarm events from different alarms, as the load on the operator differs. There are 2 reasons for this:

1. The operator response for a chattering alarm is roughly the same as if the alarm had rung only once. In other words, a chattering alarm indicates that the process is at, or close to, an alarm condition, and that the operator needs to make moves to get the process back to a non-alarm condition.
2. There may be little difference in the indication of a chattering alarm as compared to a non-chattering one (a chattering alarm may have an indication that flashes on and off; a non chattering one would have an indication that stays on).

So a sequence of chattering alarms is, as far as the operator is concerned, effectively the same as a single alarm. However, the run chart does not differentiate between a multitude of alarms from a chattering alarm and a multitude of alarms from different measurements, and therefore does not represent the true load on the operator.

Figure 2:
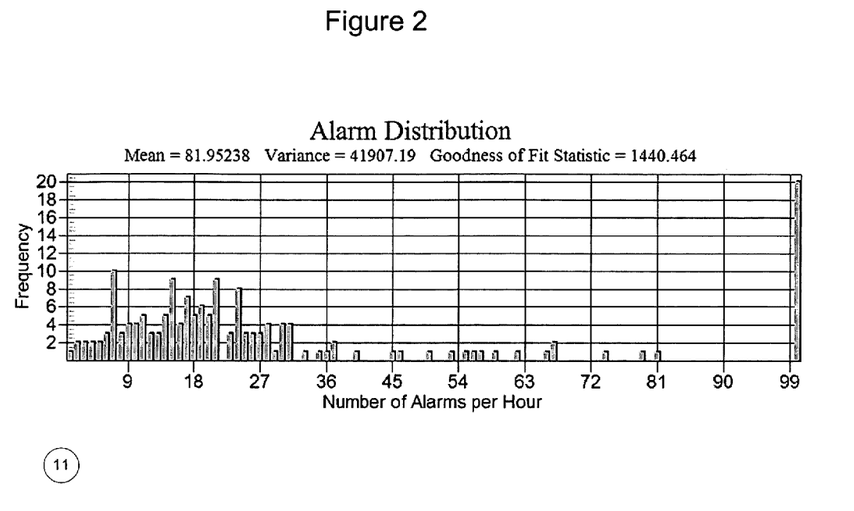
FIG. 2 is a histogram of the data from FIG. 1, which represents how many times the corresponding number of alarms per hour were observed in the data set. Alarm frequencies greater than 100 events per hour are grouped together in the point for 100 events per hour.

From a statistical viewpoint, an assumption underlying statistical quality control charts for typical alarm data sets is not valid—the statistical distribution of the alarm counts is not normally distributed. FIG. 2 is a histogram for the data of FIG. 1, which indicates that there is a roughly normal distribution centered around 18, with another peak at 100. It is possible to develop statistical quality control charts for certain non-normal distributions (Jacobs, 1990), but these are generally of the uni-modal distributions (i.e., Gamma or Poisson); there are no suitable statistical quality control techniques for multi-modal distributions such as shown in FIG. 2.

Furthermore, a chattering alarm may be thought of as an equipment failure, and these equipment failures are not apparent from the run chart of all alarm counts. What is required is a separate run chart denoting the number of these failures versus time. This would also be a statistical quality control run chart, except that the underlying distribution would be a Poisson distribution rather than a normal distribution.

Evaluation of alarm settings was discussed in U.S. Pat. No. 6,618,691, where the purpose was to determine the best alarm setting that would give an operator adequate warning without excessive "false" alarms (i.e., alarming during normal variation). However, this technique looked at only a single alarm setting and process measurement at a time, did not consider the case of chattering alarms, and did not consider the total amount of alarms presented to the operator.

Standard Statistical Quality Control (SQC) techniques can be used to ascertain whether the process itself is in an alarm condition (see for example U.S. Pat. No. 5,257,206), but using SQC to track the number of alarms is unique to this application and is not considered in this or other references.

U.S. Pat. No. 6,308,141 pertains to analyzing the number and time of alarms on an injection molding machine to determine the state of the process. Statistical quality control is one of the methods employed, but the process was specific to injection modeling machine, and the statistical analysis of the alarms was only performed to determine characteristics of the operation, not to characterize the alarm system itself.

Statistical process control was one of the technologies employed to determine alarm thresholds in U.S. Pat. No. 7,076,695. The methods were applicable to non-normal statistical distributions, but again the purpose was to determine whether a process was in alarm, not to measure the performance of the alarm system itself.

Incorporation of statistical concepts into tracking the number of process alarms then is the crux of the problem addressed by this invention. Specifically, the use of a transformation results in a normally-distributed data set and a Poisson-distributed data set that are amenable to statistical quality control techniques.

BRIEF SUMMARY OF THE INVENTION

It is a feature of the present invention to provide a method to effectively indicate the number of alarms presented to an operator of a process control system over time that accurately reflects the operating loading for these alarms. Another feather of the present invention is that the tracking system satisfies the requirements of standard statistical quality control techniques. Yet another feature is to provide a method to track the number of chattering alarms.

The techniques of this invention require transformations of the alarm data so that trends in the data are more apparent and the data follows more closely a normal distribution or a Poisson distribution. These transformations are based on sound engineering and ergonomic principles and have a strong intuitive appeal.

Additional features and advantages of the invention will be set forth in part in the description that follows, and will in part be apparent from the description, or may be learned from practice of the invention. The features and advantages of the invention may be realized by means of the combinations and steps pointed out in the appended claims.

Accordingly, objects and advantages of the present invention are:
a) To transform an alarm data set so that trends in the effective number of alarms in a given time period are apparent, meet the requirements of statistical quality control, and reflect the actual state of the process and loading on the operator.
b) To provide an indication, using the techniques of statistical quality control, of any trends in the number of chattering alarms in an alarm data set.

Further objects and advantages are that the inventions requires only historical data to determine the above, and that well-developed statistical quality control techniques are fully applicable on the data sets.

BRIEF DESCRIPTION OF THE DRAWINGS

The above and other objects, features and advantages of the present invention will become apparent from the following description and the appended claims, taken in conjunction with the accompanying drawings in which:

DETAILED DESCRIPTION OF THE INVENTION

Figure 6:
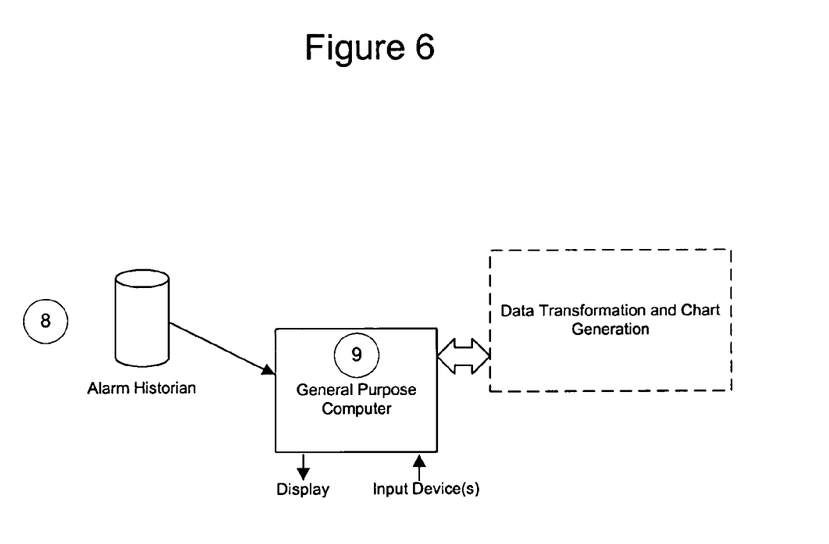
FIG. 6 is a schematic illustration of the computer system used to calculate the run chart and histogram in accordance with the present invention. The generation and construction is performed in a program in the general purpose computer.
Figure 7:
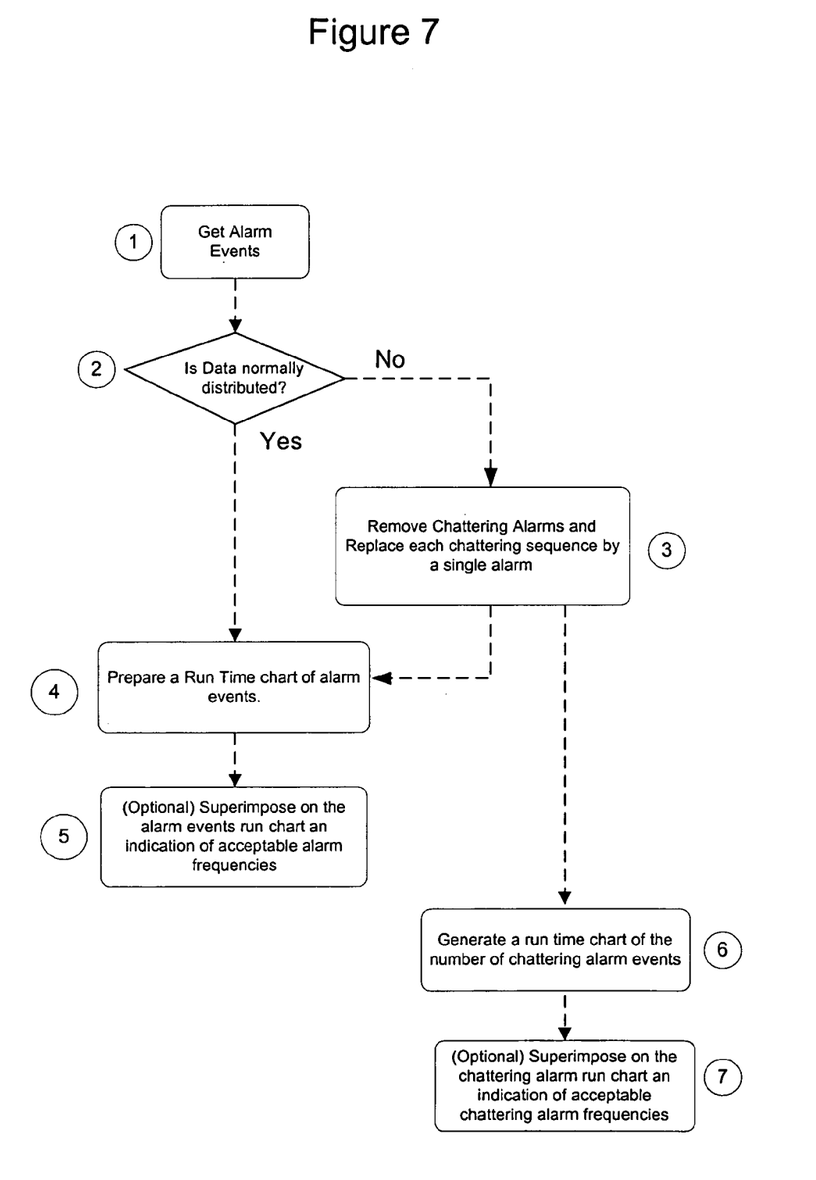
FIG. 7 is a flow chart for the methodology of this patent application.

Statistical quality control of alarm occurrences requires historized values of the alarm times over a suitably long period 1, which are usually stored in a computer historian or database 8. From this data, a standard statistical quality control run chart of the number of alarms per time period 10 and standard histogram of the alarm frequencies 11 may be generated and drawn using a general purpose computer 9. Superimposed on the run chart may be indications of acceptable values of the alarm frequency. Some standard goodness-of-fit metric may also be generated to indicate the normality of the alarm frequency distribution.

If a standard statistical goodness of fit tests indicate non-normality 2, a transformation of the data set is done by removing any chattering alarms and leaving in place the single alarm that occurred at the time that the chattering sequence started 3. A chattering alarm is defined as one that is preceded within some short period of time by an alarm of the same type from the same measurement. Another data set is generated indicating the amount of chattering alarms that occurred within each time period over the time range of the data set.

Figure 3:
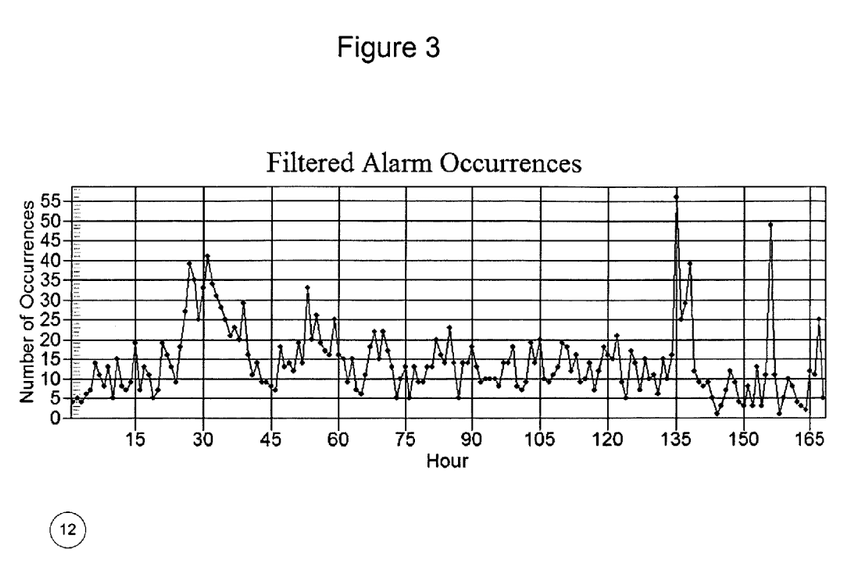
FIG. 3 is a run chart representing the number of alarms per hour for the same system as shown in FIG. 1 with the chattering alarms removed.
Figure 4:
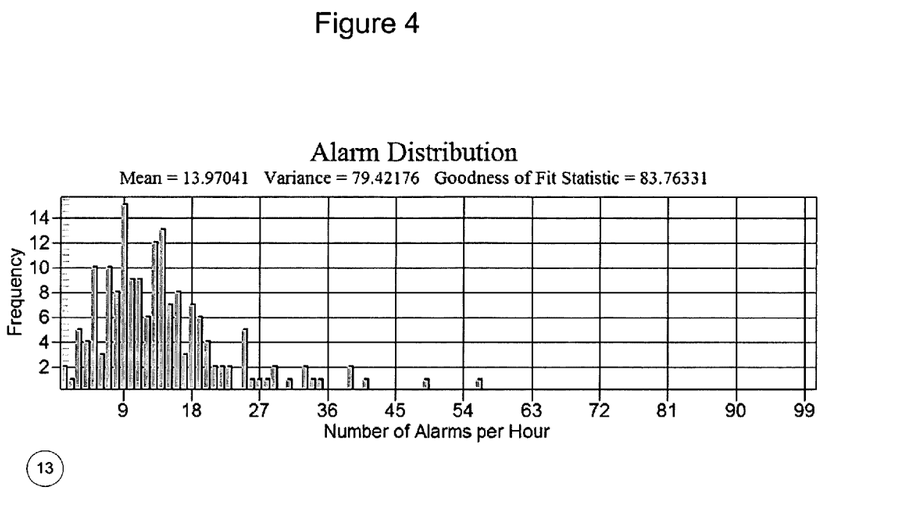
FIG. 4 is a histogram of the data from FIG. 2, which represents how many times the corresponding number of alarms per hour were observed in the data set.

Two charts are again generated 4,6, a run chart representing the number of alarms per time period 12 and a histogram are generated from the data set with the chattering alarms removed 13. These are shown as FIG. 3 and FIG. 4, and are similar to FIG. 1 and FIG. 2 respectively, except that the data set has had the chattering alarms removed. Optionally, indication of acceptable values may be superimposes on the run chart of the alarm events 5. These values may be derived based on the statistics of past data, or may be accepted industrial guidelines.

For this example data set, the chi-squared goodness-of-fit metric has decreased from 1440 to 84 (this metric is proportional to the distance squared between the actual and theoretical distributions; a lower metric indicates a distribution that is closer to the theoretical one), indicating that the data set with the chattering alarms removed follows a normal distribution much closer than the raw data. Other indications of non-normality may also be used.

Figure 5:
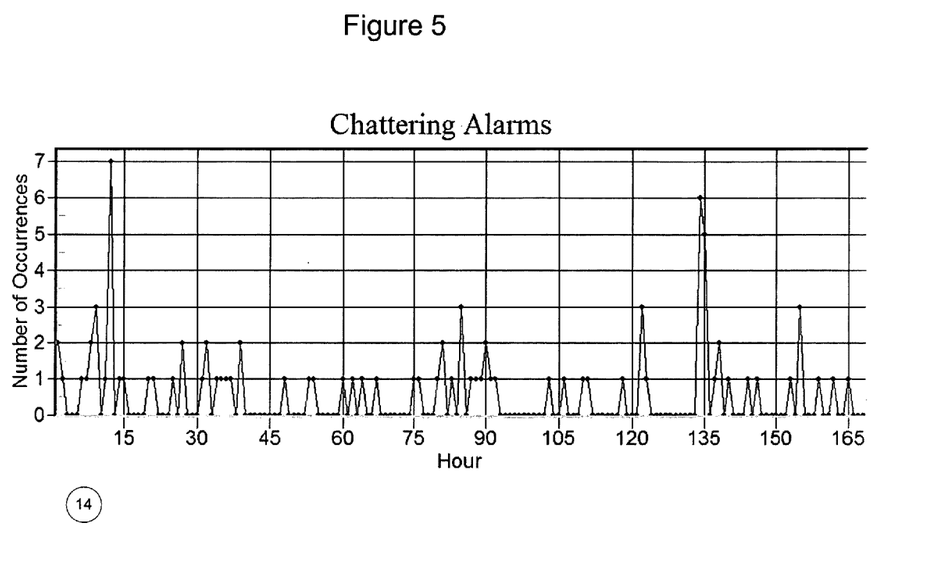
FIG. 5 is a run chart representing the number of alarms that chattered in each hour as a function of time.

Another chart is generated showing the number of chattering alarms that occurred within each time period over the time range of the data set 6. An example of such a run chart is shown as FIG. 5 14. An indication of acceptable limits may also be placed on this chart 7, which may be derived from past experience or based on industrial recommendations. Note that the values for this chart are expected to follow a Poisson distribution (and in fact they do for the example set shown).

ADDITIONAL EMBODIMENTS

1) The results may be represented as text or numbers rather than graphically.
2) The time period used to calculate the metric for the number of alarms per time period may be changed.
3) Chattering alarms may be removed from the data set regardless of the normality of the original alarm occurrence distribution.
4) The histograms and run charts may be smoothed using a suitable mathematical technique or calculated using a different method.
5) Chattering alarms may be defined, and calculated, in a different way than shown above.
6) A lower limit for the number of sequential alarms that must occur before an alarm is considered to have chattered may be specified.
7) A different statistical quality control technique other than a run or control chart may be used to indicate the data.
8) The technique may be used in an on-line method where the results are automatically updated on a scheduled or event basis and the results presented to a user in real-time.

CONCLUSIONS, RAMIFICATIONS, AND SCOPE

Accordingly, the reader will see that the method described herein results in statistical quality control charts that are much more useful for indicating the quality of an alarm system. This method requires only a history of the alarm occurrences, and involves simple transformations that have strong intuitive and statistical appeal.

Although the description above contains many specificities, these should not be construed as limiting the scope of the invention but as merely providing illustrations of some of the preferred embodiments of the invention.

Thus the scope of the invention should be determined by the appended claims and their legal equivalents, rather than the derivations given.

The invention claimed is:

1. A novel method for transforming a set of alarm event data and using the transformed data for statistical quality control, the method comprising steps of:
   a. retrieving a set of historical data of past alarm events and associated times;
   b. calculating a standard metric indicating how well the statistical distribution of said alarm events at said associated times follows a normal distribution;
   c. identifying chattering alarm sequences in said historical data, where chattering alarm sequences are defined as sequences of alarm events that occur closely in time and are of the same type on the same measurement from said set of historical data;
   d. transforming said historical data set to a transformed historical data set by replacing each said sequence of chattering alarm events from said historical data set with a single alarm event that has an associated time that is the same as a first alarm event in said sequence; and
   e. displaying said transformed historical data events and said associated times in a standard statistical quality control run or control chart, either in numerical or graphical form;
   whereby the statistical distribution of said transformed historical data is closer to a normal distribution than the statistical distribution of said historical data and better satisfies the underlying assumptions of standard statistical quality control techniques.

* * * * *

UNITED STATES PATENT AND TRADEMARK OFFICE
CERTIFICATE OF CORRECTION

PATENT NO. : 7,289,935 B1  Page 1 of 1
APPLICATION NO. : 11/497441
DATED : October 30, 2007
INVENTOR(S) : Alan J Hugo It is certified that error appears in the above-identified patent and that said Letters Patent is hereby corrected as shown below:

TITLE PAGE, ITEM (75)
ADD THE FOLLOWING INVENTOR:

JACQUELINE A. HUGO
805 WAINGARTH WAY
DANVILLE, CA 94526

Signed and Sealed this

Fourth Day of November, 2008

JON W. DUDAS
*Director of the United States Patent and Trademark Office*